(12) United States Patent
Sakai

(10) Patent No.: US 7,594,178 B2
(45) Date of Patent: Sep. 22, 2009

(54) INFORMATION PROCESSING APPARATUS, INFORMATION PROCESSING METHOD, AND CONTROL PROGRAM

(75) Inventor: Tetsuo Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 11/036,122

(22) Filed: Jan. 18, 2005

(65) Prior Publication Data

US 2005/0165759 A1 Jul. 28, 2005

(30) Foreign Application Priority Data

Jan. 22, 2004 (JP) ............... 2004-014517

(51) Int. Cl.
*G06F 15/177* (2006.01)
(52) U.S. Cl. ............. 715/736; 715/734; 709/223; 709/225
(58) Field of Classification Search ......... 715/733–739; 358/1.15, 1.13, 1.14; 709/204, 205, 217–219, 709/223, 225, 226, 229, 246
See application file for complete search history.

(56) References Cited

U.S. PATENT DOCUMENTS

| 6,525,721 | B1 * | 2/2003 | Thomas et al. ............. 345/600 |
|---|---|---|---|
| 6,633,400 | B1 * | 10/2003 | Sasaki et al. ............... 358/1.15 |
| 6,944,662 | B2 * | 9/2005 | Devine et al. ............... 709/225 |
| 7,027,169 | B1 * | 4/2006 | Morikawa et al. .......... 358/1.14 |
| 7,124,185 | B2 * | 10/2006 | Kuroyanagi ................ 709/225 |
| 7,158,248 | B2 * | 1/2007 | Smith et al. ................ 358/1.15 |
| 2003/0149917 | A1 * | 8/2003 | Smith et al. ................... 714/38 |
| 2003/0212783 | A1 * | 11/2003 | Sakai ......................... 709/223 |
| 2004/0136023 | A1 * | 7/2004 | Sato .......................... 358/1.13 |

FOREIGN PATENT DOCUMENTS

| CN | 1265753 | 9/2000 |
| EP | 1015962 | 6/1998 |
| JP | 2003-296072 | 10/2003 |
| JP | 2003-323364 | 11/2003 |

\* cited by examiner

*Primary Examiner*—Ba Huynh
(74) *Attorney, Agent, or Firm*—Fitzpatrick, Cella, Harper & Scinto

(57) ABSTRACT

A registering method in an information processing apparatus having a recording medium in which a resource downloader for downloading a resource which is used for an image forming apparatus has been stored has a device searching step of searching for devices serving as administration targets from a plurality of devices connected to a network; and a display control step of display-controlling the device onto which the resource can be downloaded so that the device can be discriminated in correspondence to each resource to be downloaded among the devices searched by the device searching step.

19 Claims, 12 Drawing Sheets

FIG. 5

| PRODUCT NAME | IP ADDRESS | TYPE OF DOWNLOAD RESOURCE |
|---|---|---|
| LaserPrinter1810 | 192.168.1.11 | PDLX Font/Form |
| LaserPrinter1810 | 192.168.1.12 | PDLX Font/Form |
| LaserPrinter1810 | 192.168.1.13 | PDLX Font/Form |
| LaserPrinter2810 | 192.168.2.11 | COLOR HIGH-SPEED PDLX Font/Form |
| LaserPrinter2810 | 192.168.2.12 | COLOR HIGH-SPEED PDLX Font/Form |
| LaserPrinter2810 | 192.168.2.13 | COLOR HIGH-SPEED PDLX Font/Form |
| MFPC3200 | 192.168.2.21 | KANJI TrueType Font/Form<br>COLOR HIGH-SPEED PDLX Font/Form<br>RGB INPUT PROFILE |
| MFPC3200 | 192.168.2.22 | KANJI TrueType Font/Form<br>COLOR HIGH-SPEED PDLX Font/Form<br>RGB INPUT PROFILE |
| MFP8500 | 192.168.3.1 | PDLX Font/Form |
| MFP5000i | 192.168.3.2 | PDLX Font/Form |
| MFP105 | 192.168.3.3 | PDLX Font/Form |
| MFP105 | 192.168.3.21 | HIGH-SPEED PDLX Font/Form |
| MFP8500 | 192.168.3.22 | HIGH-SPEED PDLX Font/Form |
| MFP8500 | 192.168.3.23 | HIGH-SPEED PDLX Font/Form |
| MFP8500 | 192.168.3.25 | HIGH-SPEED PDLX Font/Form |
| ... | ... | ... |

FIG. 9

REGISTRATION OF ADMINISTRATION TARGET DEVICE (1)

| PRODUCT NAME | IP ADDRESS | NAME |
|---|---|---|
| LaserPrinter2810 | 192.168.2.11 | |
| LaserPrinter2810 | 192.168.2.12 | |
| LaserPrinter2810 | 192.168.2.13 | |
| MFPC3200 | 192.168.2.21 | |
| MFPC3200 | 192.168.2.22 | Center M |
| MFP8500 | 192.168.3.1 | |
| MFP5000i | 192.168.3.2 | |
| MFP105 | 192.168.3.3 | |
| MFP105 | 192.168.3.21 | |
| MFP8500 | 192.168.3.22 | |
| MFP8500 | 192.168.3.23 | |

<<<< REGISTER <<<<

>>>> DELETE >>>>

NEW GROUP (2) TYPE OF RESOURCE WHICH CAN BE REGISTERED

KANJI TrueType Font/Form/COLOR HIGH-SPEED PDLX Font/Form

[ START SEARCH ]  [ OK ]  [ CANCEL ]

- ADMINISTRATION TARGET DEVICE
  - KANJI TrueType Font/Form
  - PDLX Font/Form
    - OUTPUT CENTER
    - EDITORIAL ROOM
      - 192.168.1.11 LaserPrinter1810
      - 192.168.1.12 LaserPrinter1810
    - FOR CALIBRATION
      - 192.168.1.13 LaserPrinter1810
  - HIGH-SPEED PDLX Font/Form
  - COLOR HIGH-SPEED PDLX Font/Form
  - RGB INPUT PROFILE
  - CMYK OUTPUT PROFILE
  - CMYK SIMULATION PROFILE

INFORMATION PROCESSING APPARATUS, INFORMATION PROCESSING METHOD, AND CONTROL PROGRAM

RELATED APPLICATION

This application claims priority from Japanese Patent Application No. 2004-014517, filed on Jan. 22, 2004, which is hereby incorporated by reference herein.

BACKGROUND OF THE INVENTION

1. Field of the Invention

The invention relates to an image forming apparatus including a printer, a facsimile apparatus, a copying apparatus, and their hybrid apparatus, a registering apparatus which is connected to the image forming apparatus, and the like.

2. Related Background Art

In a conventional resource downloader, for example, as shown in JP-A-2003-323364 ("Network device administrating apparatus and method, computer program, and computer-readable storing medium"), to register a device as an administration target, a group in which a type of resource as a downloading target is designated is previously formed, a device on a network which can be downloaded to such a group is searched for, and the device as an administration target is selected and registered.

Therefore, the above conventional example has the following problem.

That is, according to the conventional resource downloading method, in the case of searching for the device as an administration target, the device to be registered into the group which has been formed by preliminarily designating the resource type is searched. Therefore, it is not possible simultaneously to search for devices which handle different resources.

Therefore, to search for devices which handle different resources, it is necessary to form a plurality of device administration groups that each correspond to a different resource type and search for the devices with respect to each of the plurality of device administration groups formed as mentioned above.

Therefore, to search for the devices which handle different resources, it is necessary to form a plurality of device administration groups every different resource type and search for the devices with respect to each of the plurality of device administration groups formed as mentioned above.

SUMMARY OF THE INVENTION

In consideration of the foregoing problems, it is the first object of the invention to enable many types of devices to be registered by one searching process.

Further, it is the second object of the invention to enable the device registering operation which is executed by the user to be easily executed. The invention is made to solve at least one of the above objects.

According to the invention, there is provided a registering method in an information processing apparatus having a recording medium in which a resource downloader constructed by a resource downloading program has been stored, comprising: a device searching step of searching for devices serving as administration targets from a plurality of devices connected to a network; a list information holding step of holding list information of the devices obtained by the search in the device searching step; a list display switching step of switching a registration target device list when an administration device registering destination is selected from the device list information held in the list information holding step; a device selecting step of selecting the device from the device list when the registering destinations of the administration target devices are undecided; and a display control step of controlling a display of the device list in accordance with whether or not the devices searched in the device searching step can use the resource.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing an example of device list information of a result of search of a device on a network according to the invention;

FIG. 9 is a diagram showing an example of a result obtained by executing the second embodiment;

DETAILED DESCRIPTION OF THE PREFERRED EMBODIMENTS

First Embodiment

Figure 1:
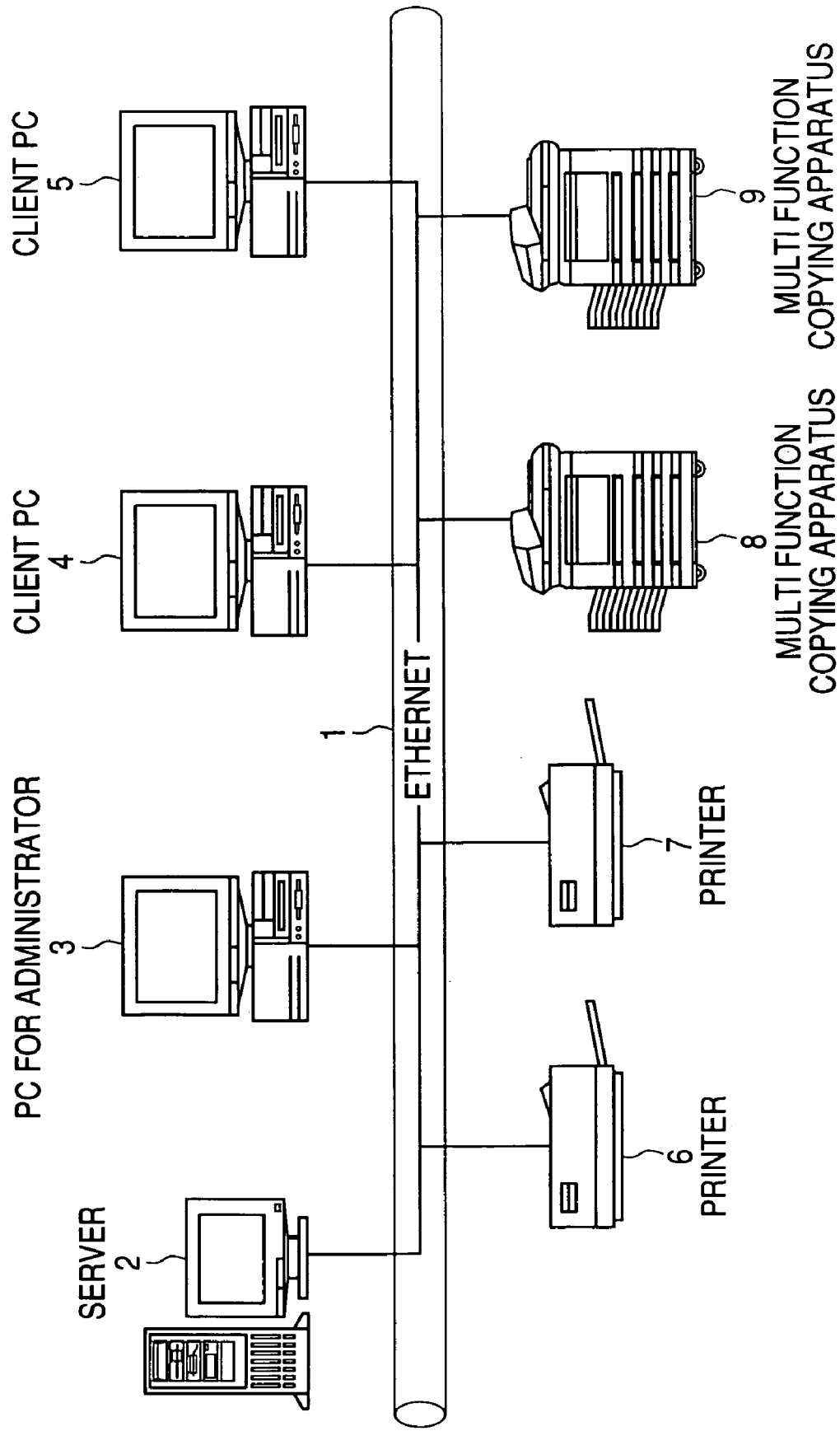
FIG. 1 is a diagram showing an example of an operation environment where a registering method of the invention is executed.

FIG. 1 is a diagram showing an example of an operation environment of a downloading program to execute a registering method of the invention. The operation environment of the downloading program will now be described with reference to FIG. 1.

In FIG. 1, reference numeral 1 denotes a network. As physical layers of the network, Ethernet (registered trade name), Local Talk, and the like can be mentioned. The embodiments will be described on the assumption that Ethernet (registered trade name) is used.

A wording "network" used in the embodiments denotes one or some of a physical cable, an electric signal which passes on the cable, and means (protocol) for realizing information exchange which is realized by a combination of electric signals and, ordinarily, indicates their general denomination.

Reference numeral 2 denotes a server computer and 3 indicates a personal computer (hereinafter, abbreviated to PC) for an administrator, that is, a computer in which a downloading program (hereinafter, also referred to as a downloader) for downloading a font onto a printer and a multi function copying apparatus operates.

Reference numerals 4 and 5 denote client PCs which are connected to the network and used by the general users (although only two client PCs are shown in the diagram, an arbitrary number of client PCs can be connected). Even if the PC is a PC for the administrator, it can be also used as a client PC. The downloader can operate on those client PCs.

Reference numerals 6 and 7 denote printers. The printers are connected to the network 1, receive print commands from the client PCs 4 and 5, and execute printing processes in accordance with the commands. The printers further receive a font downloading command and download data from the downloader and execute downloading processes of the font data in accordance with the commands.

Reference numerals 8 and 9 denote multi function copying apparatuses. Each multi function copying apparatus has an image scanner function, a printer function, and a facsimile function and can be used as a copying apparatus, a printer, a scanner, or a facsimile apparatus by combining one or a plurality of those functions. Each multi function-copying apparatus further receives the font downloading command and the download data from the downloader and executes the downloading process of the font data in accordance with the commands.

Although the simplest example as a construction other than that shown in FIG. 1 is a case where the PC for the administrator and the client PC are the same and the printer or multi function copying apparatus itself is directly connected to the PC, since it is simple, its drawing is omitted here.

An example of a construction of the PC 3 for the administrator will now be described with reference to FIG. 2.

Figure 2:
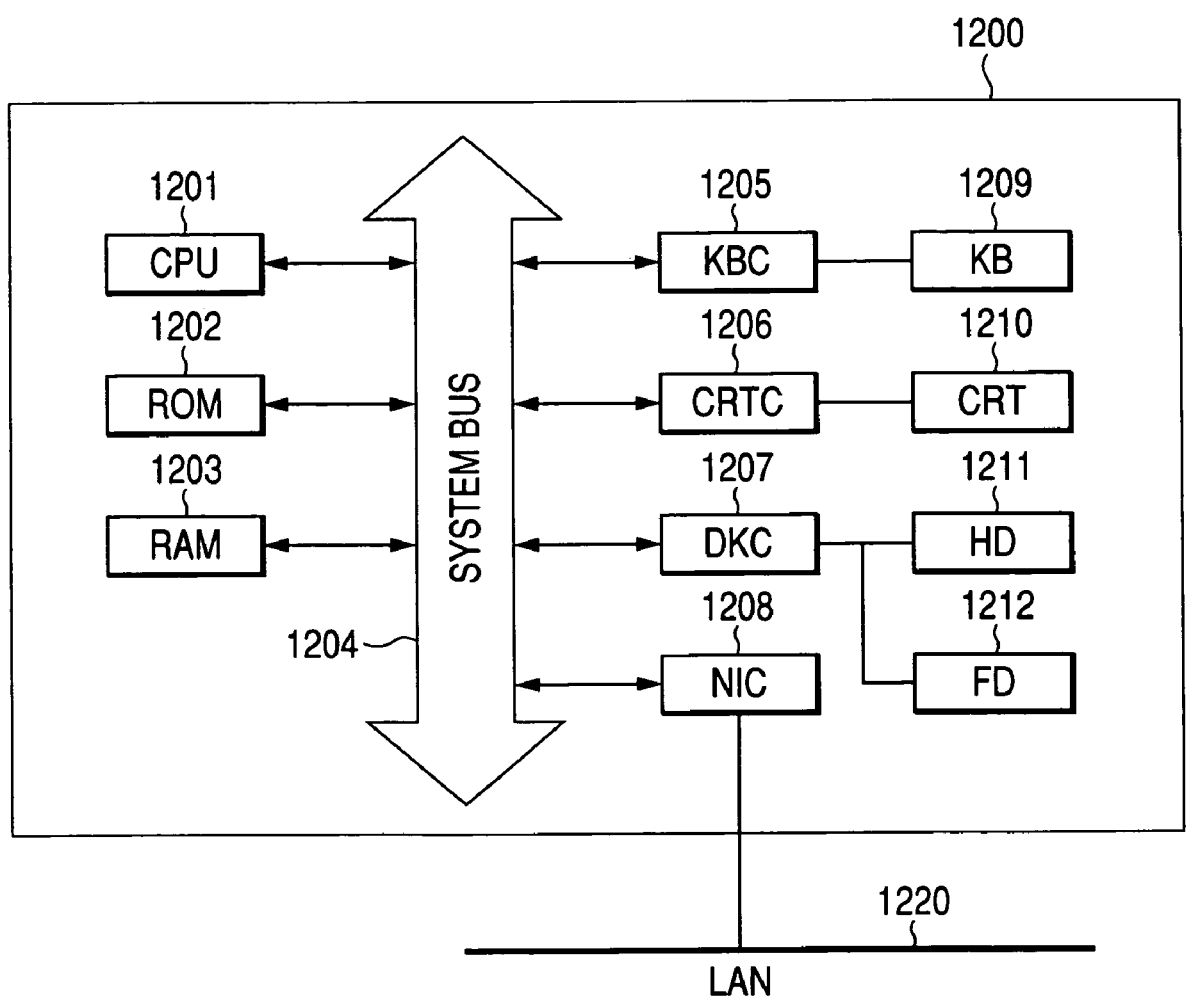
FIG. 2 is a block diagram showing a constructional example of a computer.

In FIG. 2, reference numeral 1200 denotes a computer PC. The PC 1200 has a CPU 1201, executes device control software which has been stored in a ROM 1202 or a hard disk (HD) 1211 or which is supplied from a flexible disk drive (FD) 1212, and collectively controls devices connected to a system bus 1204.

The CPU 1201 of the PC 1200 and programs stored in the ROM 1202 or the hard disk (HD) 1211 constructs respective functional means of the embodiment.

Reference numeral 1203 denotes a RAM which functions as a main memory, a work area, or the like of the CPU 1201; 1205 a keyboard controller (KBC) for making control to transmit a signal which is inputted from a keyboard (KB) 1209 into a system main body; 1206 a display controller (CRTC) for controlling the display on a display apparatus (CRT) 1210; and 1207 a disk controller (DKC) for controlling access to the hard disk (HD) 1211 and the flexible disk drive (FD) 1212 for storing a boot program (activating program for starting the execution (operation) of hardware or software of the personal computer), a plurality of applications, an edit file, a user file, a network administrating program, and the like.

Reference numeral 1208 denotes a network interface card (NIC) for bidirectionally transmitting and receiving data to/from a network printer, another network device, or another PC through a LAN (Local Area Network) 1220.

A flow for processes of the downloader which operates on the PC 3 for the administrator will now be described.

First, the downloader has been stored (installed) in an external storing area such as hard disk 1211, flexible disk 1212, or the like by a setup program or the like. When the administrator downloads a font onto the printer or the multi function copying apparatus, the downloader is activated and resident in the RAM 1203.

The downloader refers to downloading resource data from the external storing apparatus 1211 or 1212, converts the resource data into data of a format in which it can be downloaded, and temporarily stores the converted data into the RAM 1203 or the external storing apparatus 1211 or 1212.

The converted data (resource data) of the format in which it can be downloaded includes font data, form (macro) data, color resource data, and the like. Since it is unnecessary to describe the font, its explanation is omitted. The macro allows the printer (including a hybrid apparatus) side to execute a predetermined process and its typical data is constructed by a command group for forming a business form.

That is, once the macro is registered, by instructing information (macro name) to designate such a macro, a business form image is formed on the printer side and can be multiplexed to an image based on print data.

Therefore, by previously registering macros regarding a plurality of printers, even if the printing is executed by any one of them, a desired print result can be obtained. The color resource is used to unify color reproducibility. In the case of a monochromatic printer, for example, in the case where a command to print in "red" is described by a PDL, if all print data is printed by a same mesh pattern, they can be unified, so that it is useful.

A number of font data, form data, color resources, and the like have previously been stored in the external storing apparatus 1211 or 1212. The administrator properly activates the downloader so as to download one (either one or a plurality) of them onto a target printer or a group comprising a plurality of printers.

At this time, the downloader for converting the data into the data suitable for each printer and, thereafter, transferring it as mentioned above transfers the formed data in the downloading possible format to the printer or the multi function copying apparatus and executes the downloading process. At this time, the downloaded data is transferred to the printer or the multi function copying apparatus connected to the network through the NIC 1208 by using a transfer protocol such as LPR or the like.

The specific operation of the downloader in the embodiment will now be described with reference to FIGS. 3 to 12.

Figure 3:
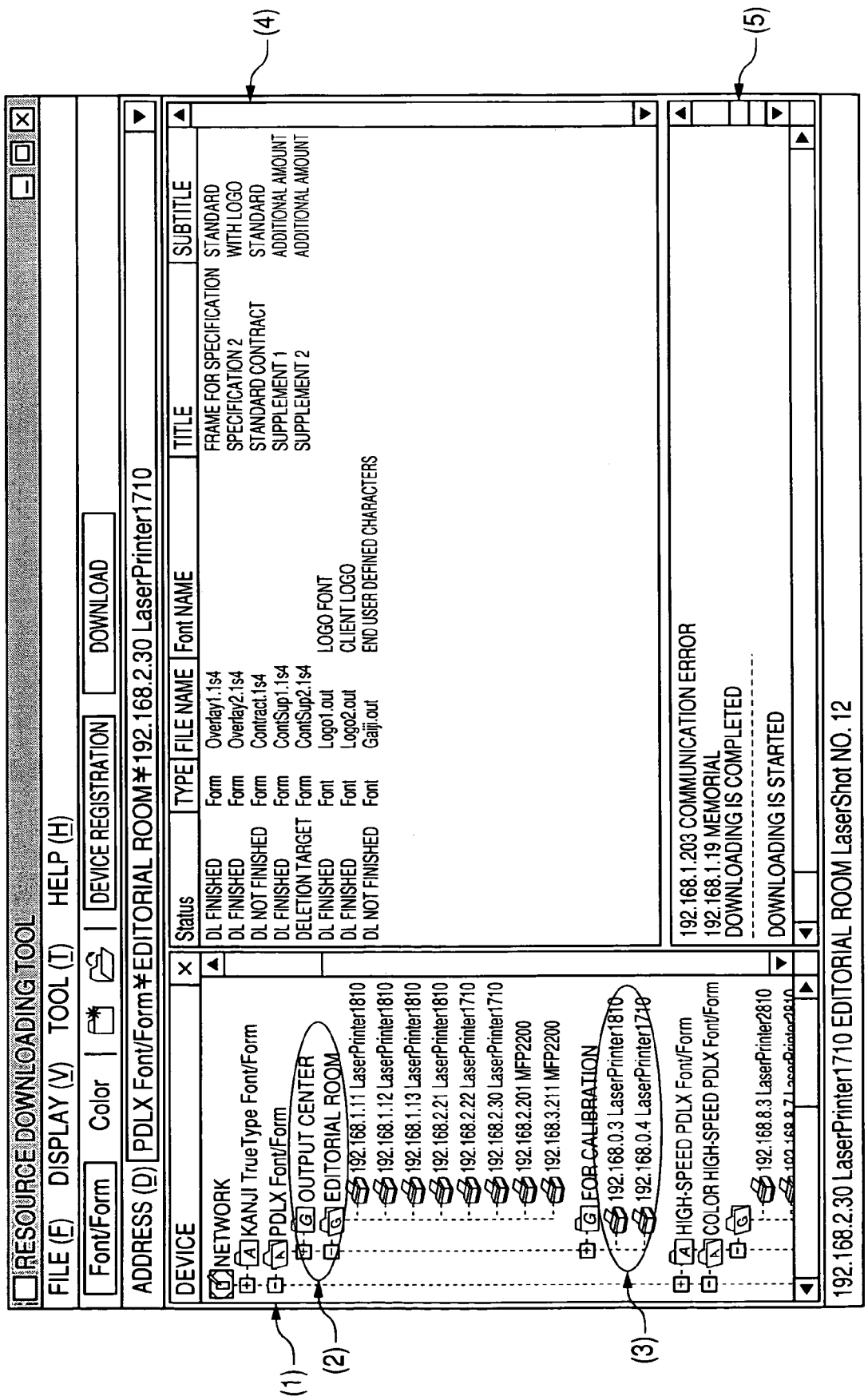
FIG. 3 is a diagram showing an example of a main display screen of a downloader.

FIG. 3 is a diagram showing an example of a main display screen of the downloader which embodies the invention. The first embodiment of the invention will now be described with reference to FIG. 3. Although a GUI of MS-Windows (registered trademark) is used as an example in the following display screen, the invention is not limited to this GUI.

In FIG. 3, FIG. 3—(1) shows classification of the resource data which is processed as an administration target by the downloader. A type of resource which can be downloaded onto a device and a device onto which the data can be downloaded are determined on the basis of such classification.

In the embodiment, an example of the downloading in a Japanese environment is used and as resource classifications corresponding to FIG. 3—(1), "Kanji (Chinese Characters) TrueType Font/Form", "PDLX Font/Form", "High-speed PDLX Font/Form", "Color high-speed PDLX Font/Form", "RGB input profile", "CMYK simulation profile", "Output profile", and the like can be given.

FIG. 3—(2) shows an example of a device group formed by the administrator in each resource classification. In this example, it is assumed that groups such as "Output center", "Editorial room", and "For calibration" have been formed. Eight devices have been registered in the group "Editorial room" and it is assumed that IP addresses "192.168.1.11", "192.168.1.12", "192.168.1.13", "192.168.2.21", "192.168.2.22", "192.168.2.30", "192.168.2.201", "192.168.3.211", and the like have been allocated to those devices, respectively.

FIG. 3—(3) shows administration target devices of "PDLX Font/Form" which are not registered in any of those groups. The devices listed here are in the status where they can be individually set. FIG. 3—(4) shows a portion indicating a setting status of the resource data which is downloaded onto the device. FIG. 3—(5) shows a portion indicating a status upon downloading.

Since the portions FIG. 3—(4) and FIG. 3—(5) are not directly concerned with the invention, their detailed description is omitted here.

Figure 4:
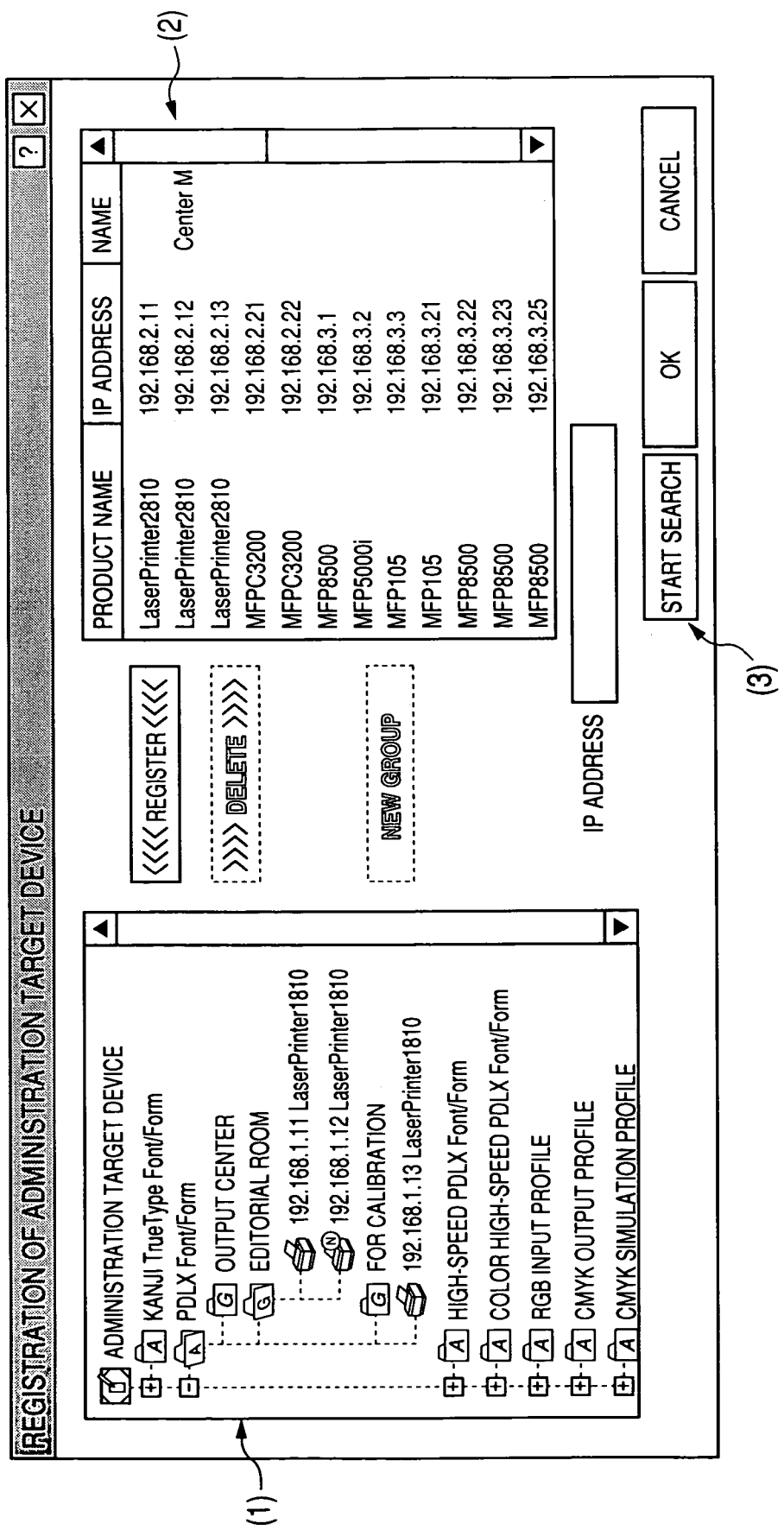
FIG. 4 is a diagram showing an example of a display screen at the time of device registration.

The devices shown in FIG. 3—(2) and FIG. 3—(3) are the devices which have been registered by the user by using a display screen as shown in FIG. 4.

FIG. 4—(1) shows resource classifications or administration target groups to which the user can register the administration target devices. The user selects a desired registration target group in FIG. 4—(1), selects an administration target device from the registration possible devices listed in FIG. 4—(2), and clicks a register button, thereby registering it into the device group.

FIG. 4—(3) shows a "start search button" to execute the device search. A flow for processes in the case where the button in FIG. 4—(3) is clicked will be described hereinbelow.

When the "start search button" in FIG. 4—(3) is clicked, the resource downloading program searches for the device which exists on the network 1 and serves as a downloading target of the resource data.

The devices serving as targets in the Japanese environment are the devices to which the following resource data can be downloaded: that is, "Kanji TrueType Font/Form"; "PDLX Font/Form"; "High-speed PDLX Font/Form"; "Color high-speed PDLX Font/Form"; "RGB input profile"; "CMYK simulation profile"; "Output profile"; and the like.

FIG. 5 is a diagram showing an example of an administration table for administrating list information of the searched devices after the "start search button" in FIG. 4—(3) was clicked. The resource downloading program here administrates the list information of the devices which can be the administration targets. Naturally, it is also considered that the devices which cannot become the administration targets make a response to a searching request. However, whether or not the device is the administration target is discriminated here prior to registering it onto the list of FIG. 5. It is assumed that in the case of the device which cannot become the administration target, it is not added to the list of FIG. 5.

Explanation will be made on the assumption that information regarding a product name of the device, an IP address of the device, and a type of resource which can be downloaded onto the device is administrated in the list of FIG. 5 with respect to each device. Although information other than those written here, for example, information regarding the PDL of the device, information regarding the downloading method, information regarding the storing medium of the downloading destination side, and the like can be administrated as list information, it is assumed here that the above three kinds of information is administrated for simplicity of explanation.

Figure 6:
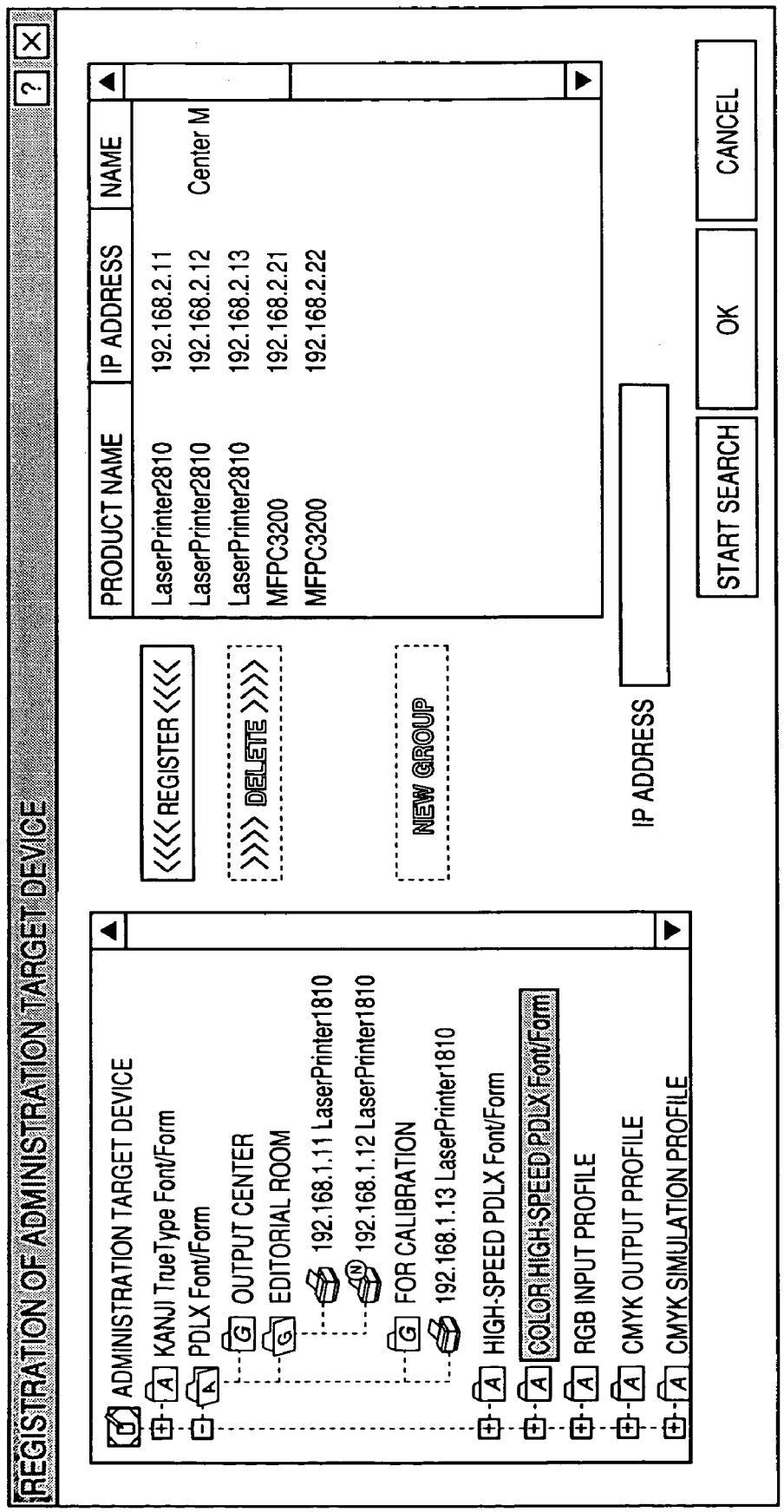
FIG. 6 is a diagram showing the first example of a result of switching of the device list information in the case where a registering destination is selected in the first embodiment.

FIG. 6 is a diagram showing an example of a display screen UI in the case where, after the administration target device was searched, the resource type "Color high-speed PDLX Font/Form" is selected as a registering destination. That is, FIG. 6 is a diagram showing an example in which only the devices of the selected resource type "Color high-speed PDLX Font/Form" are listed as compared with the display screen of FIG. 4 on which all administration target devices have been listed.

Figure 7:
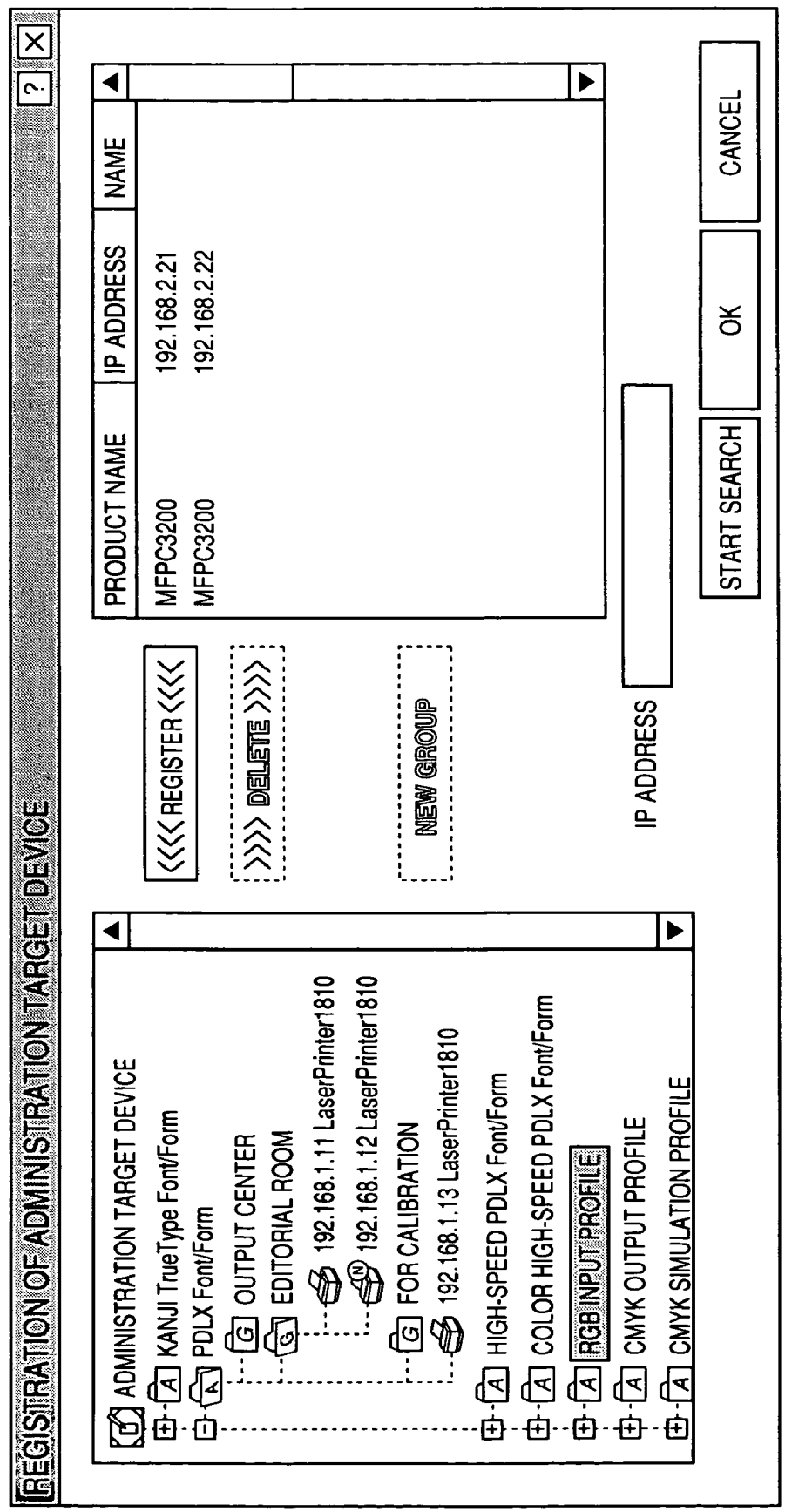
FIG. 7 is a diagram showing the second example of a result of switching of the device list information in the case where a registering destination is selected in the first embodiment.
Figure 8:
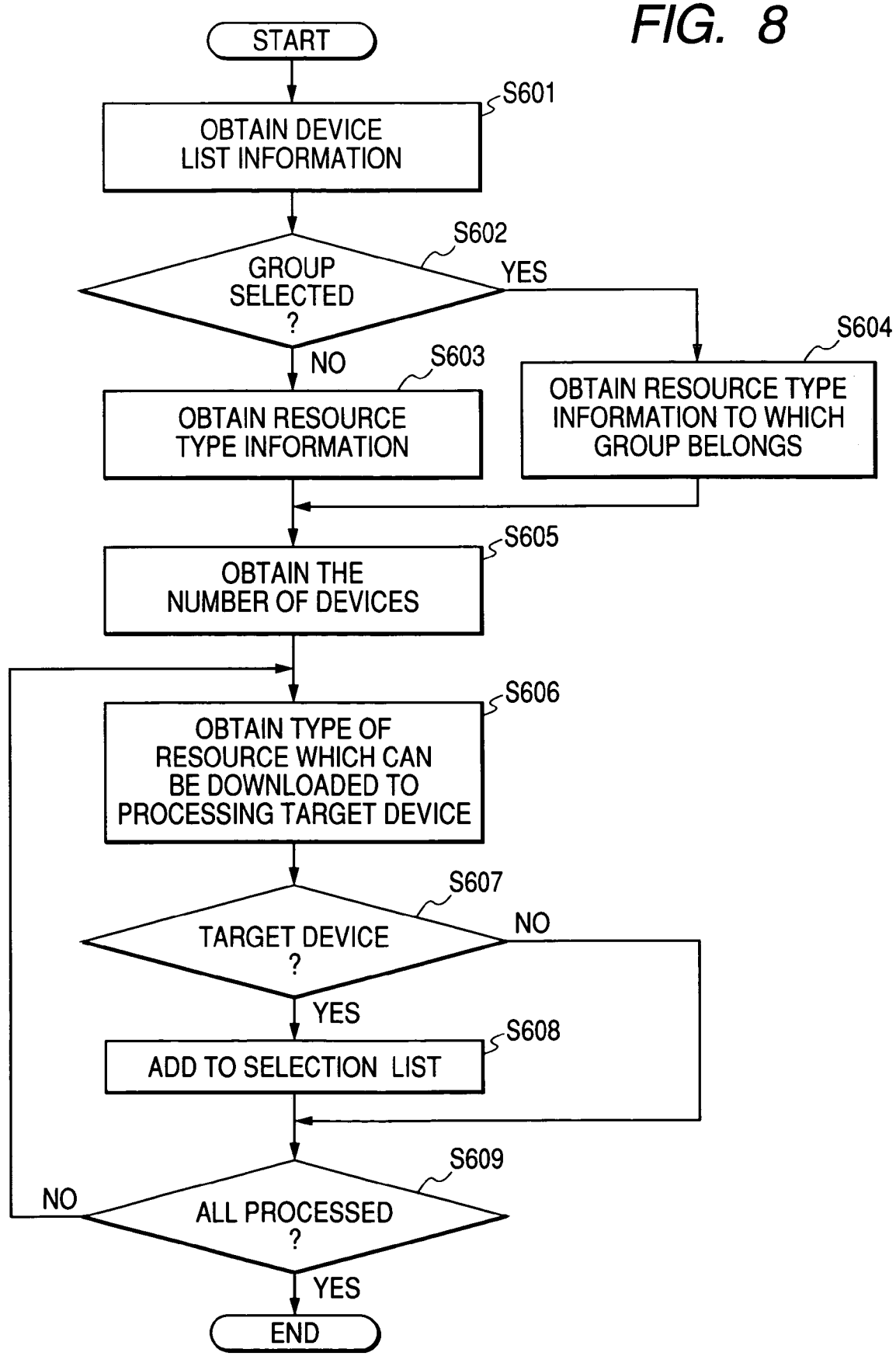
FIG. 8 is a flowchart showing a flow of processes in the first embodiment.

Similarly, FIG. 7 shows an example in the case where "RGB input profile" is selected as a registering destination. That is, FIG. 7 is a diagram showing an example in which only the devices onto which "RGB input profile" can be downloaded as registration possible devices are listed. Those processes will now be described in detail with reference to a flowchart of FIG. 8.

When the processing routine is started, first, in step S601, list information of the devices which exist on the network 1 and become the targets of the resource downloading program as a result of the device search, that is, the device list information as shown in FIG. 5 is obtained.

Subsequently, in step S602, the user discriminates whether or not the group belonging to the resource type formed by the user has been selected as a registering destination of the administration target device. As a result of the discrimination, if it is determined that such a group has been selected, step S604 follows. If the resource type is not selected, step S603 follows.

In step S603, the resource type selected as a registering destination of the device is obtained. After that, step S605 follows. If the processing routine advances to step S604, information showing to which resource type the selected group belongs is obtained. After that, step S605 follows.

In step S605, the number of devices existing in the device list information obtained in step S601 is detected and used for the following repetitive loop processes.

In next step S606, information regarding the resource type which can be downloaded onto the device which is executing the process at present in the device list information obtained in step S601 is obtained.

Subsequently, in step S607, whether or not the resource type which was obtained in step S606 and can be downloaded onto the device coincides with the resource type of the group of the resource type of the registering destination side selected at present by the user or the resource type of the group formed by the user is discriminated. As a result of the discrimination, if it is determined that they coincide, step S608 follows. If they do not coincide, step S609 follows.

In step S608, since it is determined that the device is the candidate device which should be selected by the user, its device information is displayed in the area of FIG. 4—(2) shown as a display screen for registration of the administration target devices as a list which can be selected by the user.

In next step S609, whether or not processes of all devices existing in the device list information obtained in step S601 have been executed is discriminated. As a result of the discrimination, if it is determined that the residual devices exist, the processing routine is returned to step S606 and the above processes are repeated. If it is determined in step S609 that the processes have been finished with respect to all devices, the processing routine is finished.

Second Embodiment

The second embodiment of the invention will now be described.

It is an object of the embodiment that in the case where the registering destination of the device is not selected, auxiliary information showing whether or not the data of which resource type can be downloaded to the selected device is displayed to the user, thereby enabling the user to easily execute the device registering operation.

First, the state where the device registering destination is not selected denotes the state as shown in FIG. 4, that is, the state where all devices which can be the administration targets are displayed in the portion of FIG. 4—(2).

If the registering destination in the portion of FIG. 4—(1) is selected, by executing the processes described in the first embodiment, the devices which can be registered are displayed again in the portion of FIG. 4—(2). Therefore, the device selecting operation is not troublesome to the user. However, if the device in FIG. 4—(2) is selected first without selecting the registering destination in the portion of FIG. 4—(1), it is difficult for the user to determine into which group the selected device can be registered.

FIG. 9 shows an example of a result obtained by executing the second embodiment.

As shown in FIG. 9—(1), in the case where the registration possible device is selected from the list (this state is shown in a black/white reversal state), information of the registration possible resource type is displayed in a text display area as shown in FIG. 9—(2). Auxiliary information for allowing the user to decide the registering destination is displayed.

The auxiliary information can be displayed by the text display area as shown in FIG. 9—(2) or can be also displayed by using a tool chip or the like as a general user interface in Windows (registered trademark). A flow for processes for displaying the auxiliary information will be described with reference to a flowchart of FIG. 11.

This processing routine is started when the selecting state of the device on the list is changed in the portion of FIG. 4—(2).

When the processing routine is started, in first step S901, the device list information of the search result shown in FIG. 5 is obtained.

Subsequently, in step S902, whether or not one of the target devices as shown in FIG. 9—(1) has been selected is discriminated. If it is determined as a result of the discrimination that the single target device has been selected, step S903 follows. If it is decided that the single target device is not selected, step S905 follows. The display of the area of FIG. 9—(2) is cleared and the processing routine is finished.

In step S903, the information regarding the resource type which can be downloaded is obtained from the device list information obtained in step S901. After that, step S904 follows. In step S904, the information regarding the downloading possible resource type obtained in step S903 is displayed in the portion of FIG. 9—(2).

Third Embodiment

It is an object of the third embodiment that in the case where the registering destination of the device is not selected, the user is notified of information showing what resource type of data can be downloaded onto the selected device by changing the display state of a folder of the registering destination, thereby enabling the user to easily execute the device registering operation.

First, the state where the device registering destination is not selected denotes the state as shown in FIG. 4, that is, the state where all devices which can be the administration targets are displayed in the portion of FIG. 4—(2).

When the registering destination in the portion of FIG. 4—(1) is selected, by executing the processes described in the first embodiment, the devices which can be registered are displayed again in the portion of FIG. 4—(2). Therefore, the device selecting operation is not troublesome to the user. However, if the device in FIG. 4—(2) is selected first without selecting the registering destination in the portion of FIG. 4—(1), it is difficult for the user to determine into which group the selected device can be registered.

Figure 10:
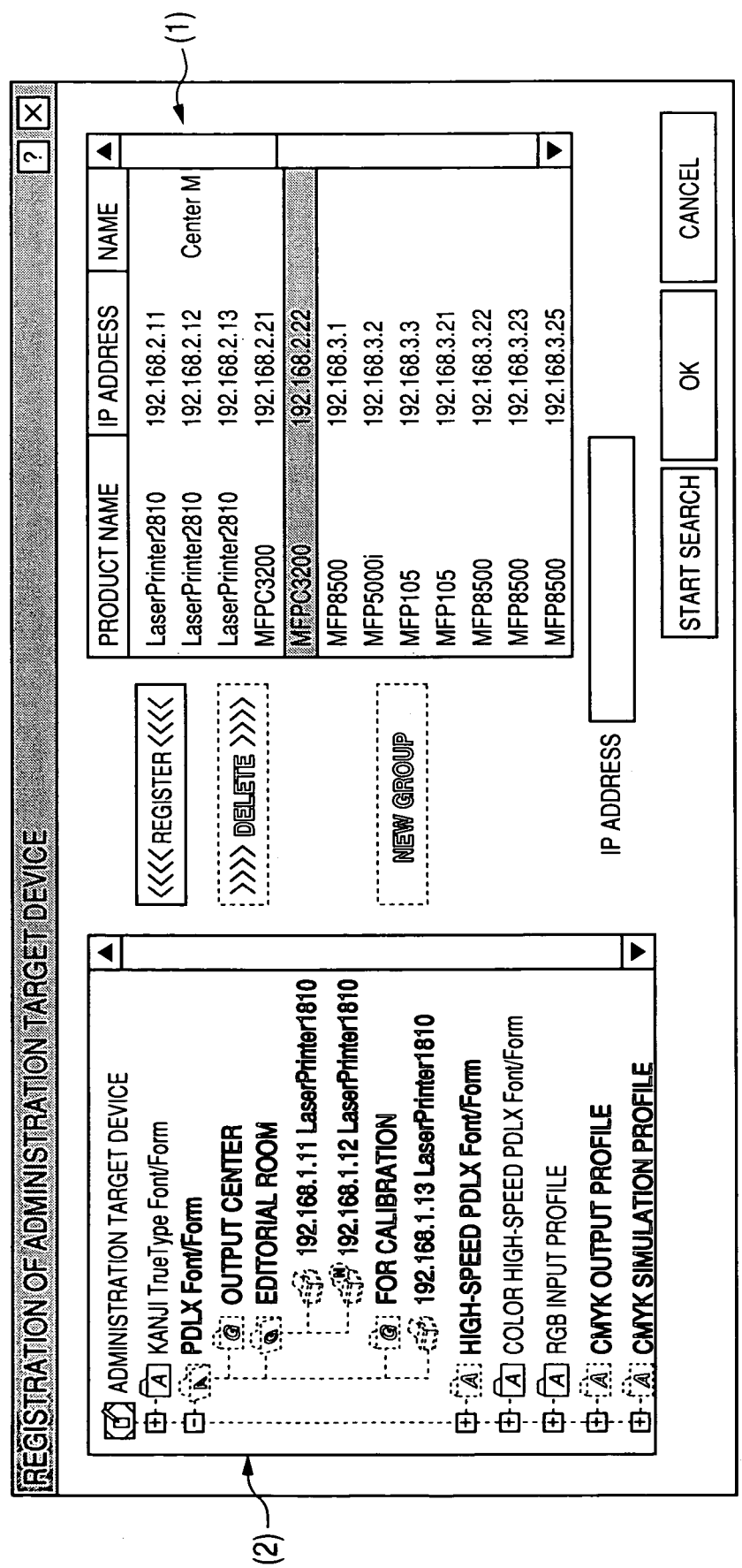
FIG. 10 is a diagram showing an example of a result obtained by executing the third embodiment.
Figure 11:
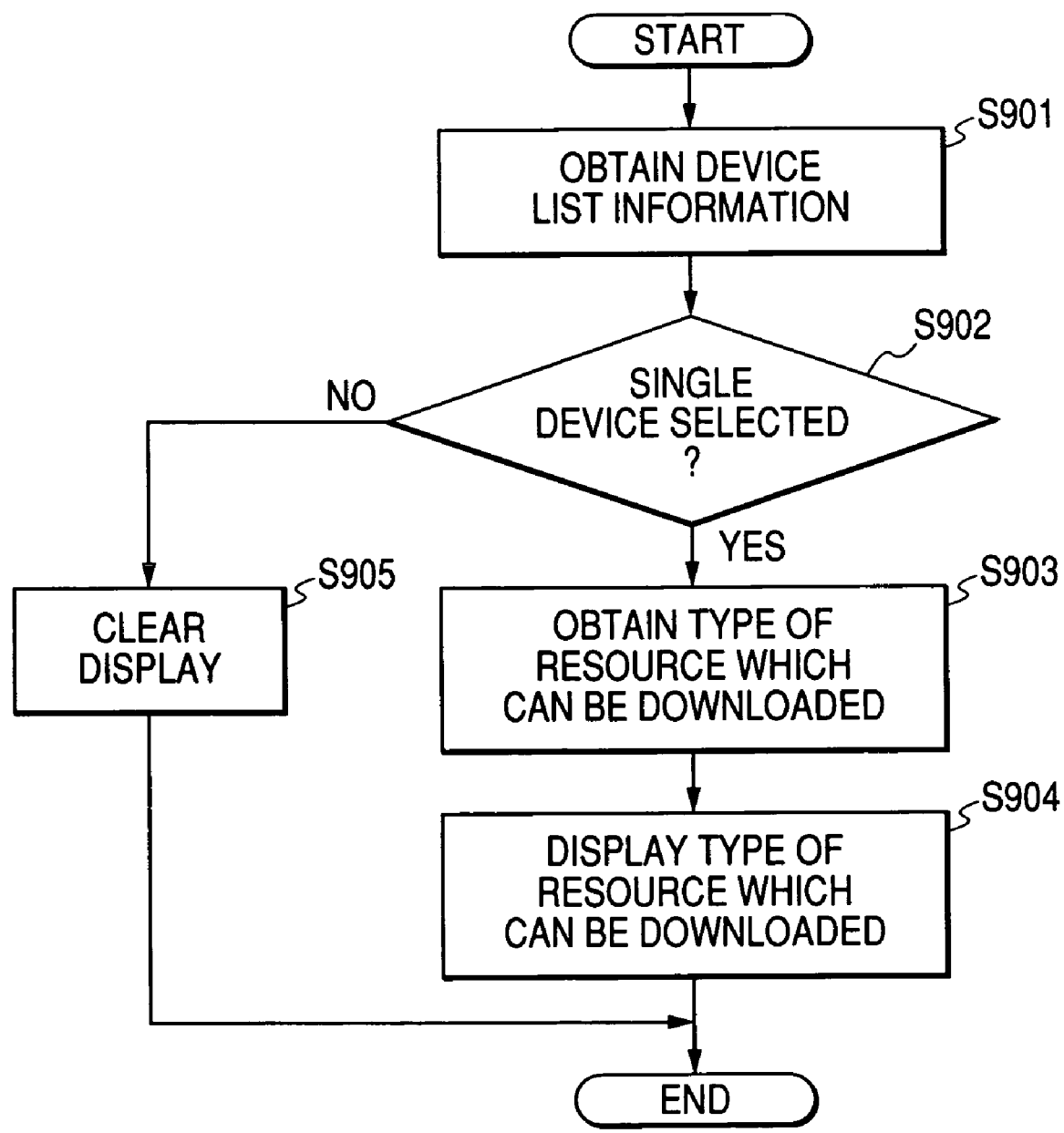
FIG. 11 is a flowchart showing a flow of processes in the second embodiment.

FIG. 10 shows an example of a result obtained by executing the registering method of the third embodiment. As shown in FIG. 10—(1), in the case where the registration possible device "MFPC3200" is selected from the displayed device list, registering destination folders as shown in FIG. 10—(2) are displayed in such a manner that the folder which can be registered is normally displayed and the folder which cannot be registered is displayed in gray.

Figure 12:
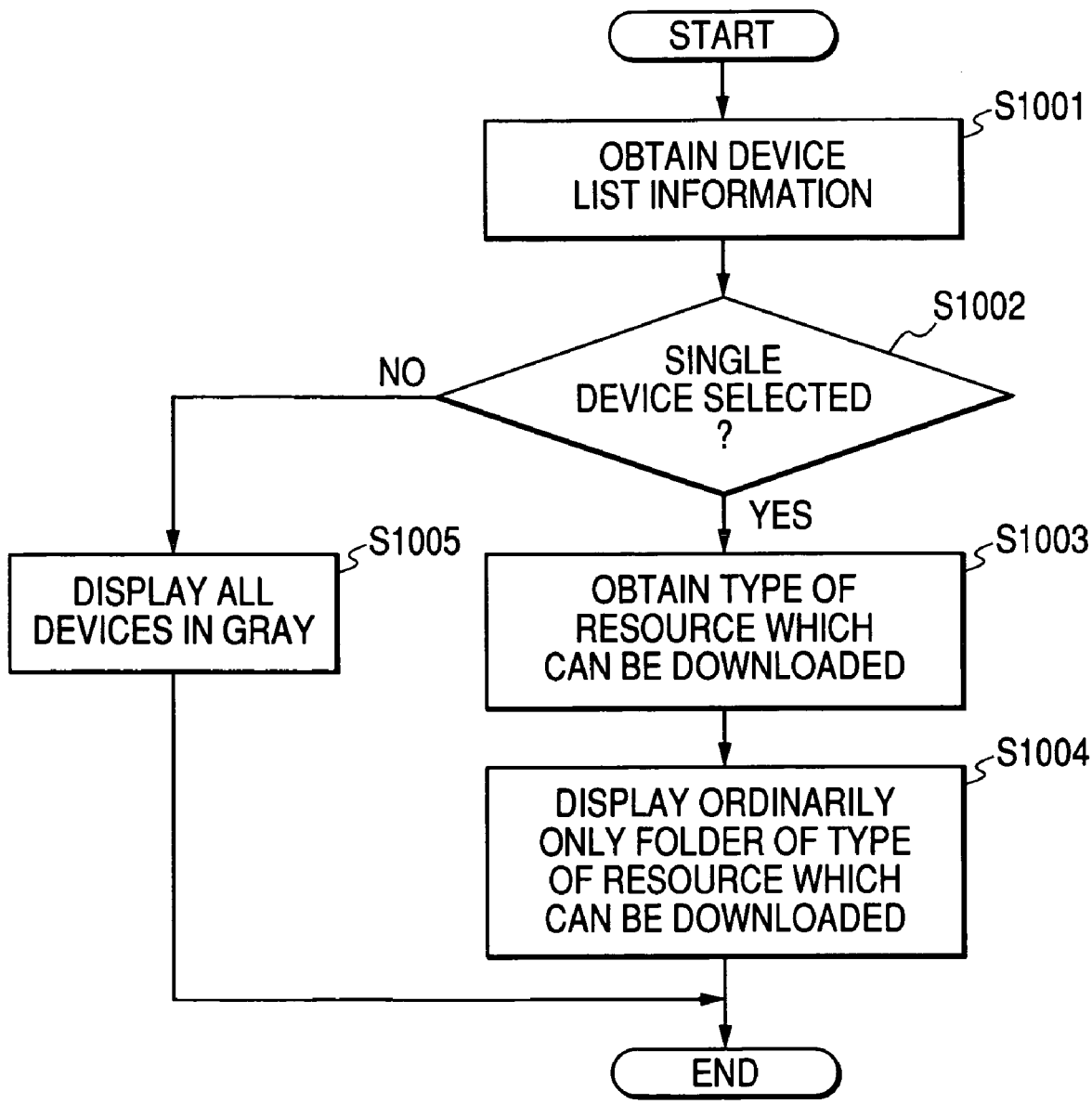
FIG. 12 is a flowchart showing a flow of processes in the third embodiment.

A flow for the folder displaying state switching process will now be described with reference to a flowchart of FIG. 12.

When the processing routine is started, in first step S1001, the device list information as a search result shown in FIG. 5 is obtained. Subsequently, in step S1002, whether or not the single target device "MFPC3200" has been selected as shown in FIG. 10—(1) is discriminated.

If it is decided as a result of the discrimination that the single target device has been selected, step S1003 follows. If it is decided that the single target device is not selected, step S1005 follows. All folders in FIG. 10—(2) are displayed in the state where they cannot be selected (all of them are displayed in gray), and the processing routine is finished.

In step S1003, information regarding the resource type which can be downloaded is obtained from the device list information obtained in step S1001, and step S1004 follows.

In step S1004, on the basis of the downloading possible resource type obtained in step S1003, a display control process for controlling the folder display in FIG. 10—(2) in such a manner that the folder which can be registered is normally displayed and the folder which cannot be registered is displayed in gray showing that it cannot be selected is executed.

Other Embodiments of the Invention

The invention also incorporates a case where in order to make various devices operative so as to realize the functions of the foregoing embodiments, program codes of software to realize the functions of the embodiments mentioned above are supplied to a computer in an apparatus or a system connected to the various devices and the various devices are operated in accordance with the programs stored in the computer (a CPU or an MPU) of the system or the apparatus.

In this case, the program codes themselves of the software realize the functions of the embodiments mentioned above. The program codes themselves and means for supplying the program codes to the computer, for example, a recording medium in which such program codes have been stored constructs the invention. For example, a flexible disk, a hard disk, an optical disk, a magnetooptic disk, a CD-ROM, a magnetic tape, a non-volatile memory card, a ROM, or the like can be used as a recording medium for recording the program codes.

Not only in the case where the computer executes the supplied program codes, so that the functions of the embodiments mentioned above are realized but also in the case where the program codes incorporate with an OS (Operating System), another application software, or the like which is operating in the computer and the functions of the embodiments mentioned above are realized, those program codes are incorporated within the purview of the embodiments of the present invention.

Further, the invention also incorporates a case where the supplied program codes are stored into a memory provided for a function expanding board of a computer or a function expanding unit connected to the computer, thereafter, a CPU or the like provided for the function expanding board or the function expanding unit executes a part or all of actual processes on the basis of instructions of the program codes, and the functions of the embodiments mentioned above are realized by those processes.

What is claimed is:

1. A registering method in an information processing apparatus having a recording medium in which a resource downloader for downloading a resource which is used for an image forming apparatus has been stored, comprising:
   a device searching step of searching for devices to be managed as administration target devices from among a plurality of devices connected to a network;
   a display control step of controlling displaying such that from among the devices searched in said device searching step, devices to which respective resources can be downloaded are displayed with correspondence to the respective resources distinguishably from other devices;
   a list information holding step of holding list information of the devices searched in said device searching step;
   a resource type grouping step of grouping the administration target devices included in the device list information held in said list information holding step into resource type groups having respective download resource types, as registration target devices;
   a user grouping step of grouping the administration target devices included in the device list information held in said list information holding step into user device groups formed by the user, as registration target devices;
   a list display switching step of switching, when one of the resource type groups or one of the user device groups is selected as an administration target device registering destination in the device list information held in said list information holding step, to a list of the registration target devices included in the selected resource type group or user device group; and
   a device selecting step of selecting one or more devices from the device list based on user instructions, when no group is selected from among the resource type groups and the user device groups as the administration target device registering destination,
   wherein information on the devices searched in said device searching step includes resource types of resources which can be downloaded to the devices, and said display control step controls displaying of the device list in accordance with the switching made in said list display switching step.

2. A method according to claim 1, wherein, in said display control step, in a case where the device is selected from a displayed device list, if the selected device does not correspond to the resource, the display is controlled so that the resource cannot be downloaded onto that device.

3. A method according to claim 1, wherein, in said display control step, in a case where the selected device does not correspond to the resource, a display state of a registering destination folder is displayed in gray, thereby notifying a user that the registration is impossible.

4. A method according to claim 1, wherein, in said list information holding step of holding the device list information of the search result, product names of the devices are held.

5. A method according to claim 1, wherein, in said list information holding step of holding the device list information of the search result, IP addresses of the devices are held.

6. A method according to claim 1, further comprising an auxiliary information displaying step of displaying auxiliary information when the device is selected from the displayed device list in a case where no group is selected from among the resource type groups and the user device groups as the administration target device registering destination,
   and wherein, in said auxiliary information displaying step, information regarding downloading resource type is displayed.

7. A method according to claim 6, wherein, in said auxiliary information displaying step, the resource type which can be registered is normally displayed and the resource type which cannot be registered is displayed in gray.

8. A method according to claim 6, wherein, in said auxiliary information displaying step, a resource type group which can be registered is normally displayed and a resource type group which cannot be registered is displayed in gray.

9. A method according to claim 1, wherein the resource type groups and the user device groups are formed in a layered structure with the user device groups being placed under the resource type groups.

10. An information processing apparatus having a recording medium in which a resource downloader for downloading a resource which is used for an image forming apparatus has been stored, comprising:
    device searching means for searching for devices to be managed as administration target devices from among a plurality of devices connected to a network;
    display control means for controlling displaying such that from among the devices searched by said device searching means, devices to which respective resources can be downloaded are displayed with correspondence to the respective resources distinguishably from other devices;
    list information holding means for holding list information of the devices searched by said device searching means;
    resource type grouping means for grouping the administration target devices included in the device list information held by said list information holding means into resource type groups having respective download resource types, as registration target devices;
    a user grouping means for grouping the administration target devices included in the device list information held by said list information holding means into user device groups formed by the user, as registration target devices;
    list display switching means for switching, when one of the resource type groups or one of the user device groups is selected as an administration target device registering destination in the device list information held by said list information holding means, to a list of the registration target devices included in the selected resource type group or user device group; and
    device selecting means for selecting one or more devices from the device list based on user instructions, when no group is selected from among the resource type groups and the user device groups as the administration target device registering destination,
    wherein information on the devices searched by said device searching means includes resource types of resources which can be downloaded to the devices, and said display control means control displaying of the device list in accordance with the switching made by said list display switching means.

11. An apparatus according to claim 10, wherein, in a case where the device is selected from the displayed device list, if the selected device does not correspond to the resource, said display control means controls the display so that the resource cannot be downloaded onto that device.

12. An apparatus according to claim 10, wherein, in a case where the selected device does not correspond to the resource, said display control means controls the display so that a display state of a registering destination folder is displayed in gray, thereby notifying a user that the registration is impossible.

13. An apparatus according to claim 10, wherein list information holding means for holding the device list information of the search result holds product names of the devices.

14. An apparatus according to claim 10, wherein said list information holding means for holding the device list information of the search result holds IP addresses of the devices.

15. An apparatus according to claim 10, further comprising auxiliary information displaying means for displaying auxiliary information when the device is selected from the displayed device list in a case where no group is selected from among the resource type groups and the user device groups as the administration target device registering destination, and wherein said auxiliary information displaying means displays information regarding downloading resource type.

16. An apparatus according to claim 15, wherein said auxiliary information displaying means normally displays the resource type which can be registered and displays in gray the resource type which cannot be registered.

17. An apparatus according to claim 15, wherein said auxiliary information displaying means normally displays a resource type group which can be registered and displays in gray a resource type group which cannot be registered.

18. An apparatus according to claim 10, wherein the resource type groups and the user device groups are formed in a layered structure with the user device groups being placed under the resource type groups.

19. A computer-readable medium storing in executable form a program for causing a computer to perform a registering method in an information processing apparatus having a recording medium in which a resource downloader for downloading a resource which is used for an image forming apparatus has been stored, wherein said program allows a computer to execute:

a device searching step of searching for devices to be managed as administration target devices from among a plurality of devices connected to a network;

a display control step of controlling displaying such that from among the devices searched in said device searching step, devices to which respective resources can be downloaded are displayed with correspondence to the respective resources distinguishably from other devices;

a list information holding step of holding list information of the devices searched in said device searching step;

a resource type grouping step of grouping the administration target devices included in the device list information held in said list information holding step into resource type groups having respective download resource types, as registration target devices;

a user grouping step of grouping the administration target devices included in the device list information held in said list information holding step into user device groups formed by the user, as registration target devices;

a list display switching step of switching, when one of the resource type groups or one of the user device groups is selected as an administration target device registering destination in the device list information held in said list information holding step, to a list of the registration target devices included in the selected resource type group or user device group; and a device selecting step of selecting one or more devices from the device list based on user instructions, when no group is selected from among the resource type groups and the user device groups as the administration target device registering destination, wherein information on the devices searched in said device searching step includes resource types of resources which can be downloaded to the devices, and said display control step controls displaying of the device list in accordance with the switching made in said list display switching step.

* * * * *